US006944287B2

(12) United States Patent
Mori

(10) Patent No.: US 6,944,287 B2
(45) Date of Patent: Sep. 13, 2005

(54) PORTABLE TERMINAL

(75) Inventor: Ukyo Mori, Tokyo (JP)

(73) Assignee: NEC Corporation, Tokyo (JP)

(*) Notice: Subject to any disclaimer, the term of this patent is extended or adjusted under 35 U.S.C. 154(b) by 746 days.

(21) Appl. No.: 09/859,205

(22) Filed: May 16, 2001

(65) Prior Publication Data

US 2002/0001381 A1 Jan. 3, 2002

(30) Foreign Application Priority Data

May 18, 2000 (JP) ....................................... 2000-146901

(51) Int. Cl.[7] ................................................ H04M 1/00
(52) U.S. Cl. ........................... 379/390.01; 379/390.01; 455/556.1
(58) Field of Search ....................... 379/387.01, 390.01; 455/556.1

(56) References Cited

U.S. PATENT DOCUMENTS 5,978,689 A 11/1999 Tuoriniemi et al.

FOREIGN PATENT DOCUMENTS

| | | |
|---|---|---|
| CN | 1116023 A | 1/1996 |
| GB | 2308775 | 7/1997 |
| JP | 4-243358 | 8/1992 |
| JP | 04243358 | 8/1992 |
| JP | 5-6958 | 1/1993 |
| JP | 5-91583 | 4/1993 |
| JP | 9-187060 | 7/1997 |
| JP | 10-23115 | 1/1998 |
| JP | 10-190789 | 7/1998 |
| JP | 10-276250 | 10/1998 |
| JP | 10-308976 | 11/1998 |
| JP | 11017787 | 1/1999 |
| JP | 11-150777 | 6/1999 |
| JP | 11-168534 | 6/1999 |

(Continued)

OTHER PUBLICATIONS

Copy of The People's Republic of China Office Action dated Aug. 27, 2004 (and English translation of same).

(Continued)

*Primary Examiner*—Jefferey F. Harold
(74) *Attorney, Agent, or Firm*—Dickstein, Shapiro, Morin & Oshinsky, LLP.

(57) ABSTRACT

A radio terminal is disclosed which can be switched into a talking mode simply when a telephone call terminates while sound data of music or the like is being played back and besides can assure a good talking quality. A stereo headphone microphone unit connected to a portable telephone set body includes first and second earphones and a microphone disposed in the proximity of the second earphone. Except during telephone conversation, music played back by a music playback section is enjoyed using the earphones. If a termination detection section detects termination of a call, then if music is being played back, then the playback is stopped temporarily, and a first control section supplies a ringing tone only to the first earphone and enables telephone conversation by means of the first earphone and the microphone. When the telephone conversation comes to an end, playback of the music playback section is started from a portion of the music at which the playback was temporarily stopped. Playback of music by the music playback section is stopped if a battery remaining amount detection section detects that the remaining amount of the battery becomes lower than the lowest level with which telephone conversation is possible. During telephone conversation, no sound is outputted from the second earphone. Therefore, an echo can be prevented from being transmitted to the other party of telephone communication.

6 Claims, 8 Drawing Sheets

FOREIGN PATENT DOCUMENTS

| | | |
|---|---|---|
| JP | 2000308269 | 11/2000 |
| WO | WO-99/03294 | 1/1999 |
| WO | WO 99/43136 | 8/1999 |
| WO | WO-00/64216 | 10/2000 |

OTHER PUBLICATIONS

Copy of The People's Republic of China Office Action dated Oct. 24, 2003 (and English translation of same).

Copy of Japanese Office Action dated Sep. 24, 2003 (and English translation of relevant portion).

HTTP://www.my–siemens.com/com.aperto/MySiemens/Files/Addon/an/hq/mw/hd/sl45__ug__int__eng__3.pdf, Siemens SL45 Mobile Phone Manual, ppp 1, 2, 25–27, Apr. 25, 2001.

HTTP://www.hardwarezone.com/articles/articles.hwz?cid=24&aid=196&page=4, Siemens SL45 MP3/WAP Mobile Phone, Feb. 19, 2001.

PORTABLE TERMINAL

BACKGROUND OF THE INVENTION

1. Field of the Invention

The present invention relates to a portable terminal having a calling function like a PHS (Personal Handyphone System) terminal, and more particularly to a portable terminal by means of which a user can enjoy sound data such as music in a stereo mode.

2. Description of the Related Art

Portable terminals represented by a portable telephone set such as a PHS (Personal Handyphone system) have exhibited very remarkable development and functional improvement and not only have a calling function but are very often designed as small-size information processing apparatus which can access various networks such as the Internet to upload or download data. Particularly, attention is attracted to reception and playback of videos and music by a radio terminal as a result of augmentation of compression and playback techniques of data.

For example, Japanese Utility Model Laid-Open No. 6958/1993 proposes an apparatus wherein a headphone stereo set and a portable telephone set are integrated. According to the proposal, if a telephone call terminates at the telephone set during playback of music by the headphone stereo set, then the ringing tone is played back preferentially so that the user may be notified of the telephone call termination with certainty. More particularly, according to the apparatus proposed, when music is not enjoyed with the headphone stereo set, a buzzer on a body panel of the telephone set emits sound similarly as in an ordinary portable telephone set, but when music is enjoyed, the headphone stereo set itself outputs a ringing tone so that the user may respond to the terminating call with certainty.

The apparatus of the proposal, however, is disadvantageous in that, when a telephone call terminates, if the volume of music being played back is very great or the ringing tone is confusing with music being played back, then the user is liable to miss the ringing tone or a considerable time is required until the user becomes aware of the ringing tone being outputted.

Thus, Japanese Patent Laid-Open No. 243358/1992 discloses an apparatus of the type described above wherein, if a telephone call terminates at the portable telephone set while the portable telephone set is in a music playback mode, then the playback of music is placed into a muting state and a voice signal of the other party of the terminating call is added by an addition circuit thereby to prevent a phenomenon that the voice signal cannot be heard well due to the music.

A further improved apparatus of the type described is disclosed in Japanese Patent Laid-Open No. 187060/1998. The apparatus includes a radio terminal and an earphone microphone unit, and if a telephone call terminates during playback of music, then the playback of music is interrupted and a ringing tone is outputted from the earphone microphone unit. Then, the radio terminal is automatically switched to a talking mode. This enables hand-free talking with the radio terminal. With the apparatus, however, if a telephone call terminates while the radio terminal body is accommodated in a bag or the like, then the radio terminal is switched into a talking mode immediately. As a result, the user cannot respond to the terminating telephone call for a considerably long time, and the telephone call may possibly be abandoned.

Thus, Japanese Patent Laid-Open No. 23115/1998 discloses an apparatus of the type described which responds to a telephone call rapidly if the telephone call terminates when music is enjoyed with a headphone while the radio terminal body is accommodated in a bag or the like. According to the apparatus, a terminating call response button and a clearing button are provided on a remote controller for the headphone. If a telephone call terminates, then music being played back is stopped and telephone conversation can be started when the user depresses the terminating call response button. Accordingly, if a telephone call terminates while the apparatus is accommodated in a bag or the like, the problem described above can be solved by depressing the terminating call response button when the radio terminal body is taken out. If the clearing button is depressed when the telephone conversation comes to an end, then the temporarily stopped playback of music can be started. The apparatus, however, is disadvantageous in that special hardware of the remote controller for the headphone must be prepared and therefore the production cost of the radio terminal is increased as much.

FIG. 7 shows part of a circuit of a radio terminal proposed as a countermeasure for solution of such problems as described above. Referring to FIG. 7, the radio terminal generally denoted at 100 includes a headphone 103 including a first speaker 101 and a second speaker 102, an apparatus body 104, and a headphone attachment terminal 105 for allowing connection between the headphone 103 and the apparatus body 104. An antenna 111 is mounted on the apparatus body 104. The apparatus body 104 has a radio telephone section, a stereo sound processing section, and a switching section disposed therein. The radio telephone section includes a transmission/reception circuit 112 connected to antenna 111, a voice processing circuit 113 connected to the transmission/reception circuit 112 for processing voice to be transmitted and received, a received voice amplification circuit 115 connected to the voice processing circuit 113 for amplifying received voice, and a transmission voice amplification circuit 116 for amplifying voice to be transmitted. The stereo sound processing section includes a stereo music playback circuit 117 for playing back stereo sound, and a first sound amplification circuit 118 and a second sound amplification circuit 119 connected to the stereo music playback circuit 117. The switching section includes a first changeover switch 121 and a second changeover switch 122. A ringer 123 for notifying a user of the radio terminal 100 of termination of a telephone call is connected to the transmission/reception circuit 112 of the radio telephone section.

In the radio terminal 100, output terminals of the first and second changeover switches 121 and 122 are connected to corresponding ones of the first and second speakers 101 and 102 through the headphone attachment terminal 105. The first and second sound amplification circuits 118 and 119 are connected to corresponding ones of music input side terminals of the first and second changeover switches 121 and 122. Accordingly, when the stereo music playback circuit 117 is playing back stereo sound, a music output for one ear outputted from the first sound amplification circuit 118 is inputted through the first changeover switch 121 to the first speaker 101, from which sound is outputted. Meanwhile, another music output for the other ear outputted from the second sound amplification circuit 119 is inputted through the second changeover switch 122 to the second speaker 102, from which sound is outputted similarly.

It is assumed here that a telephone call terminates while the user is enjoying music in this manner. In this instance, the transmission/reception circuit 112 of the radio telephone section controls the stereo music playback circuit 117 to decrease the sound volume in playback of music and controls the stereo music playback circuit 117 to generate particular sound so that a ringing tone is outputted from the first speaker 101 and the second speaker 102. However, when playback of music is not being performed, the ringer 123 notifies the user of termination of a telephone call. If the user depresses a predetermined button disposed at an operation section not shown of the apparatus body 104 in response to the termination of the telephone call to start telephone conversation with the other party, then the first and second changeover switches 121 and 122 are switched to the opposite contacts to those shown in FIG. 7. Consequently, the received voice amplification circuit 115 is connected to the first speaker 101 while the transmission voice amplification circuit 116 is connected to the second speaker 102.

As a result of the switching, a voice signal received by the transmission/reception circuit 112 and processed by the voice processing circuit 113 is amplified by the received voice amplification circuit 115 and then outputted from the first speaker 101. At this time, the user will remove the second speaker 102 from the ear, hold it with its hand and use it as a microphone. The voice uttered toward the second speaker 102 is amplified by the transmission voice amplification circuit 116 and processed by the voice processing circuit 113 and the transmission/reception circuit 112, and then signaled to the other party from the antenna 111.

For the radio terminal 100 shown in FIG. 7, special hardware of a remote controller for the headphone need not be prepared. Accordingly, the apparatus can be produced at a cost reduced as much. However, if a telephone call terminates, then the user removes the second speaker 102 of the headphone 103 from its ear and talks using the second speaker 102 as a microphone. Accordingly, the radio terminal 100 is disadvantageous in that it requires an operation of removing one of the speakers from the ear of the user and, if the other first speaker 101 is removed in error, then since the arrangement of the microphone and the speaker is reverse, the user cannot hear the voice of the other party nor can transmit its voice to the other party.

FIG. 8 shows a general configuration of a radio terminal which includes a stereo headphone microphone proposed to eliminate the disadvantages described above. Referring to FIG. 8, the radio terminal generally denoted at 200 includes a portable telephone set body 201, a playback unit 202 for a mini disk (MD) connected to the portable telephone set body 201, and a stereo headphone microphone unit 203 connected to the portable telephone set body 201 similarly. The stereo headphone microphone unit 203 is used in an apparatus disclosed in Japanese Patent Laid-Open No. 168534/1999 and other documents and includes a first earphone (or speaker) 205, a second earphone (or speaker) 206, and a microphone 207 disposed in the proximity of the second earphone 206. The stereo headphone microphone unit 203 is conventionally used popularly.

Where the stereo headphone microphone unit 203 described above is used, each time a telephone call terminates, the user need not remove one of the earphones or speakers from its ear, but may input voice to the microphone provided separately. However, where the stereo headphone microphone unit 203 is used, since the second earphone 206 and the microphone 207 are disposed at a short distance, improvement in echo path is difficult. Accordingly, the stereo headphone microphone unit 203 is disadvantageous in that sound outputted from the second earphone 206 is taken into the microphone 207 and transmitted as an echo to the other party of telephone conversation.

The stereo headphone microphone unit 203 is disadvantageous further in that, since a pair of amplification circuits are provided separately for a telephone and for playback of music and a switch for switching the amplification circuits must be provided, an increased number of parts are required and an increased production cost is required as much, similarly with the apparatus described hereinabove with reference to FIG. 7.

The stereo headphone microphone unit 203 is disadvantageous also in that, when playback of sound data of music or the like is proceeding with the radio terminal while the stereo headphone microphone unit 203 is used, if the stereo headphone microphone unit 203 is not removed, then the user cannot hear an external announcement well or cannot speak easily with people around the user.

SUMMARY OF THE INVENTION

It is an object of the present invention to provide a radio terminal which can be switched into a talking mode simply when a telephone call terminates while playback of sound data of music or the like is proceeding and besides can assure a good talking quality.

It is another object of the present invention to provide a radio terminal which allows a user to hear external sound or to talk with people around the user easily when playback of sound data of music or the like is proceeding.

In order to attain the objects described above, according to an aspect of the present invention, there is provided a portable terminal, comprising a stereo headphone microphone unit including first and second electroacoustic conversion means for converting an electric signal into sound and a microphone disposed in the proximity of the second electroacoustic conversion means, sound data storage means for storing at least part of sound data of music or the like, sound data playback means for reading out the sound data from the sound data storage means and outputting the sound data, stereo amplification means for amplifying the sound data outputted from the sound data playback means and supplying the amplified sound data to the first and second electroacoustic conversion means of the stereo headphone microphone unit so that sound may be outputted in stereo from the first and second electroacoustic conversion means, call termination detection means for detecting termination of a call, playback temporary stopping means for temporarily stopping, if the sound data is being played back by the sound data playback means at a point of time when the call termination detection means detects termination of a call, the playback of the sound data, and control means for disabling an output of the stereo amplification means which corresponds to the second electroacoustic conversion means of the stereo headphone microphone unit but enabling telephone conversation by means of the first electroacoustic conversion means and the microphone at a point of time when the call termination detection means detects termination of a call.

In the portable terminal, sound data of music or the like stored in the sound data storage means can be played back using the sound data playback means and outputted stereophonically from the stereo headphone microphone unit, and if termination of a call is detected by the call termination detection means, then when sound data is being played back by the sound data playback means, the playback of sound data is temporarily stopped and telephone conversation can be started. Further, the control means disables the output of the stereo amplification means which corresponds to the second electroacoustic conversion means of the stereo headphone microphone unit but enables telephone conversation by means of the first electroacoustic conversion means and the microphone at a point of time when the call termination detection means detects the termination of the call. Accordingly, such a situation that sound outputted from the second electroacoustic conversion means is caught by the microphone and sent to the other party can be prevented.

Particularly, with the portable terminal, the stereo headphone microphone unit including the first and second electroacoustic conversion means and the microphone disposed in the proximity of the second electroacoustic conversion means is used such that, upon playback of sound, the first and second electroacoustic conversion means are used to enable stereophonic playback of sound, but upon telephone conversation, the output of the stereo amplification means corresponding to the second electroacoustic conversion means of the stereo headphone microphone unit is disabled. Further, when the call termination detection means detects termination of a call, if sound data is being played back by the sound data playback means, then the playback of sound data is temporarily stopped. Consequently, the user can hear sound, which can be played back monaurally such as a ringing tone or voice of the object party of telephone conversation, sufficiently well. Besides, since the microphone disposed in the proximity of the second electroacoustic conversion means receives no sound from the second electroacoustic conversion means, otherwise possible deterioration of the talking quality by an echo can be prevented advantageously.

According to another aspect of the present invention, there is provided a portable terminal, comprising a stereo headphone microphone unit including first and second electroacoustic conversion means for converting an electric signal into sound and a microphone disposed in the proximity of the second electroacoustic conversion means, sound data storage means for storing at least part of sound data of music or the like, sound data playback means for reading out the sound data from the sound data storage means and outputting the sound data, stereo amplification means for amplifying the sound data outputted from the sound data playback means and supplying the amplified sound data to the first and second electroacoustic conversion means of the stereo headphone microphone unit so that sound may be outputted in stereo from the first and second electroacoustic conversion means, call termination detection means for detecting termination of a call, playback temporary stopping means for temporarily stopping, if the sound data is being played back by the sound data playback means at a point of time when the call termination detection means detects termination of a call, the playback of the sound data, control means for disabling an output of the stereo amplification means which corresponds to the second electroacoustic conversion means of the stereo headphone microphone unit but enabling telephone conversation by means of the first electroacoustic conversion means and the microphone at a point of time when the call termination detection means detects termination of a call, and sound playback re-starting means for re-starting, if the playback of the sound data is proceeding when the call terminates, the playback of the sound data at a point of time at which the telephone conversation comes to an end in a condition wherein the outputs of the stereo amplification means to the first and second electroacoustic conversion means are enabled from the point of the sound data at which the playback is stopped by the playback temporary stopping means.

Also in the portable terminal, sound data of music or the like stored in the sound data storage means can be played back using the sound data playback means and outputted stereophonically from the stereo headphone microphone unit, and if termination of a call is detected by the call termination detection means, then when sound data is being played back by the sound data playback means, the playback of sound data is temporarily stopped and telephone conversation can be started. Further, the control means disables the output of the stereo amplification means which corresponds to the second electroacoustic conversion means of the stereo headphone microphone unit but enables telephone conversation by means of the first electroacoustic conversion means and the microphone at a point of time when the call termination detection means detects the termination of the call. Accordingly, such a situation that sound outputted from the second electroacoustic conversion means is caught by the microphone and sent to the other party can be prevented. Further, when the call terminates, the sound playback re-starting means re-starts playback of sound data in a condition wherein the outputs of the stereo amplification means to the first and second electroacoustic conversion means are enabled from the point of the sound data at which the playback of sound data is stopped. Consequently, playback of the sound data can be re-started simply.

Particularly, with the portable terminal, if playback of sound data is proceeding when a call terminates, then the playback of the sound data is re-started at a point of time at which the telephone conversation comes to an end in a condition wherein the outputs of the stereo amplification means to the first and second electroacoustic conversion means are enabled from the position of the sound data at which the playback is stopped by the playback temporary stopping means. Consequently, in such a case that playback of sound data is proceeding immediately before telephone conversation is started, the playback of the sound data can be re-started, at a point of time when the telephone conversation comes to an end, from the position at which the playback was stopped. Besides, whereas the telephone conversation proceeds with monaural sound or voice, since the playback of the sound data is performed using the first and second electroacoustic conversion means, a necessary procedure for re-starting playback of music or the like can be simplified significantly.

According to a further aspect of the present invention, there is provided a portable terminal, comprising a stereo headphone microphone unit including first and second electroacoustic conversion means for converting an electric signal into sound and a microphone disposed in the proximity of the second electroacoustic conversion means, sound data storage means for storing at least part of sound data of music or the like, battery remaining amount detection means for detecting a remaining amount of a battery for supplying power to the entire portable terminal, sound data playback means for reading out the sound data from the sound data storage means and outputting the sound data, stereo amplification means for amplifying the sound data outputted from the sound data playback means and supplying the amplified sound data to the first and second electroacoustic conversion means of the stereo headphone microphone unit so that sound may be outputted in stereo from the first and second electroacoustic conversion means, control means for enabling telephone conversation by means of the first electroacoustic conversion means and the microphone in a condition wherein an output of the stereo amplification means which corresponds to the second electroacoustic conversion means of the stereo headphone microphone unit is disabled, and sound data playback limitation means for limiting playback of sound by the sound data playback means when the remaining amount of the battery detected by the battery remaining amount detection means is smaller than a lowest limit amount with which a predetermined talking amount is assured.

In the portable terminal, sound data of music or the like stored in the sound data storage means can be played back using the sound data playback means and outputted stereophonically from the stereo headphone microphone unit. Further, the user can talk using the first electroacoustic conversion means and the microphone in a condition wherein the output of the stereo amplification means corresponding to the second electroacoustic conversion means of the stereo headphone microphone unit is disabled. According, such a situation that sound outputted from the second electroacoustic conversion means is caught by the microphone and sent to the other party can be prevented. However, if consumption of the battery as a result of playback of sound data makes telephone conversation impossible, then the function of the portable terminal is lost. Therefore, the portable terminal which has a talking function and a function of playing back sound data stored in the sound data storage means includes the battery remaining amount detection means for detecting the remaining amount of a battery for supplying power to the entire portable terminal, and limits playback of sound data by the sound data playback means when the remaining amount of the battery detected by the battery remaining amount detection means is smaller than the lowest limit amount with which a predetermined talking amount is assured. Consequently, such a situation that the talking function of the portable terminal cannot be utilized any more as a result of consumption of the battery while playback of sound data is continued can be prevented.

The portable terminal may further comprise a switch for invalidating the detection of the battery amount detection means.

The portable terminal is likely to have a spare battery or receive supply of power from a commercial power supply. In such a case, with the portable terminal, even if the battery remaining amount detection means detects that the remaining amount of the battery is small, the detection of the battery remaining amount detection means is invalidated to eliminate the limitation to the playback of sound data.

According to a still further aspect of the present invention, there is provided a terminal, comprising a stereo headphone microphone unit including first and second electroacoustic conversion means for converting an electric signal into sound and a microphone disposed in the proximity of the second electroacoustic conversion means, sound data storage means for storing at least part of sound data of music or the like, sound data playback means for reading out the sound data from the sound data storage means and outputting the sound data, stereo amplification means for amplifying the sound data outputted from the sound data playback means and supplying the amplified sound data to the first and second electroacoustic conversion means of the stereo headphone microphone unit so that sound may be outputted in stereo from the first and second electroacoustic conversion means, a changeover switch disposed at a position of the portable terminal at which the changeover switch can be operated by a user while the user wears the stereo headphone microphone thereon, and control means for transmitting an output of the microphone to the first electroacoustic conversion means when the changeover switch is on and for stopping an output of the second electroacoustic conversion means and suppressing or stopping an output of the sound data playback means while the on-state of the changeover switch continues.

In the portable terminal, sound data of music or the like stored in the sound data storage means can be played back using the sound data playback means and outputted stereophonically from the stereo headphone microphone unit. Further, the changeover switch is used to transmit the output of the microphone to the first electroacoustic conversion means and to stop the output of the second electroacoustic conversion means and suppress or stop the output of the sound data playback means while the on-state of the changeover switch continues. Consequently, the user can hear external sound or talk with other people around the user. Further, if the changeover switch is not operated, then playback of sound data can be performed preferentially.

The portable terminal may further comprise playback temporary stopping means for temporarily stopping, if the sound data is being played back by the sound data playback means at a point of time when the call termination detection means detects termination of a call, the playback of the sound data, and control means for disabling an output of the stereo amplification means which corresponds to the second electroacoustic conversion means of the stereo headphone microphone unit but enabling telephone conversation by means of the first electroacoustic conversion means and the microphone at a point of time when the call termination detection means detects termination of a call.

In the portable terminal, the playback temporary stopping means temporarily stops playback of sound data when a call terminates, and telephone conversation is enabled by means of the first electroacoustic conversion means and the microphone while the output of the stereo amplification means corresponding to the second electroacoustic conversion means of the stereo headphone microphone unit is disabled. In other words, temporary stopping of playback of sound data when a call terminates at the portable terminal and disabling of the output of the stereo amplification means corresponding to the second electroacoustic conversion means are performed by the portable terminal. Consequently, upon termination of a call, the talking mode can be switchably established compulsorily, different from the changeover switch described above. Accordingly, even when the user is absorbed in playback of sound data, telephone conversation can be assured.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
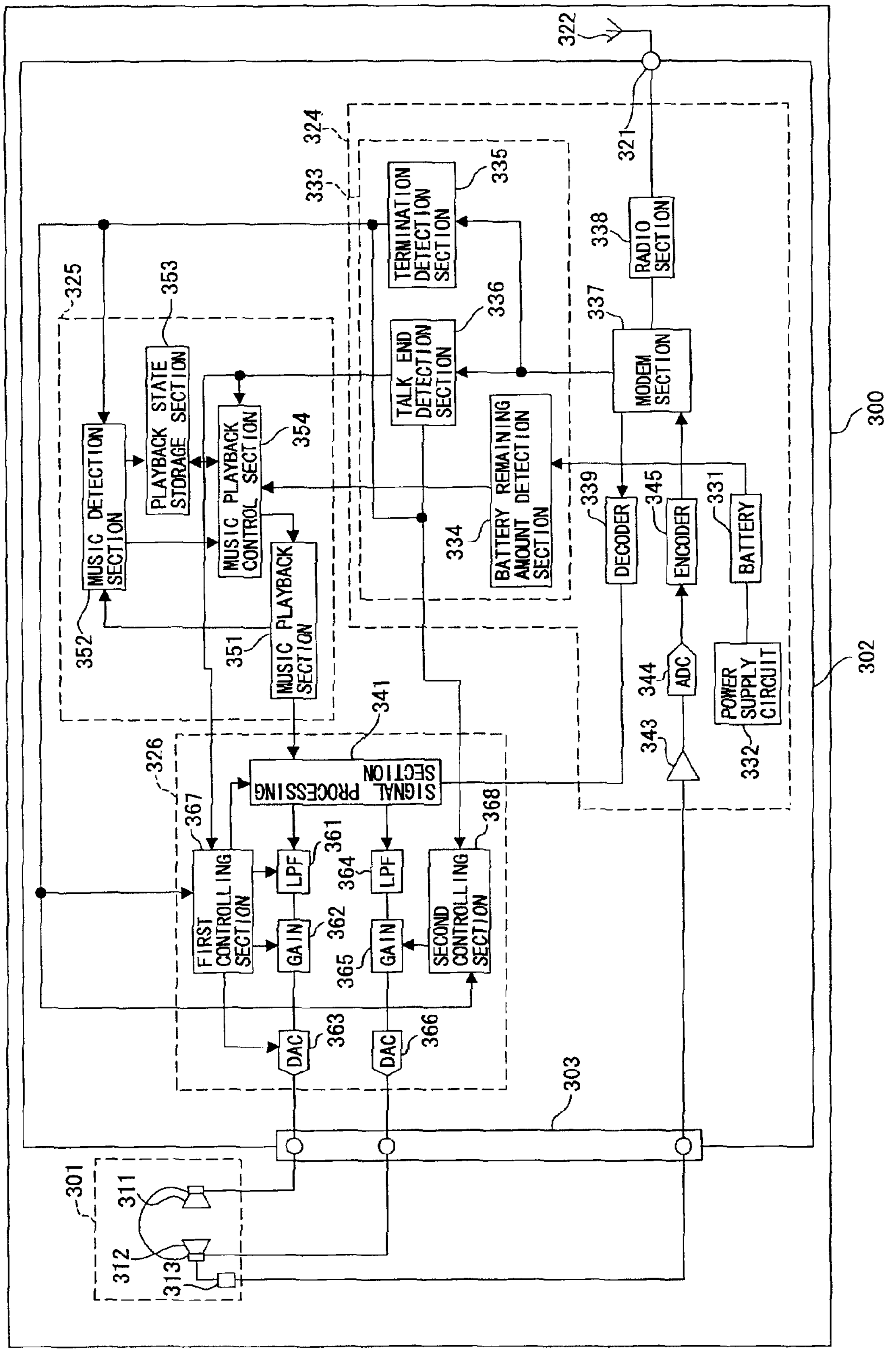
FIG. 1 is a block diagram showing a configuration of a radio terminal to which the present invention is applied.

Referring to FIG. 1, there is shown a configuration of a radio terminal to which the present invention is applied. The radio terminal is generally denoted at 300 and includes a stereo headphone microphone unit 301, a portable telephone set body 302, and a stereo headphone microphone jack 303 for connecting the stereo headphone microphone unit 301 and the portable telephone set body 302. The stereo headphone microphone unit 301 includes a first earphone 311, a second earphone 312, and a microphone 313 positioned in the proximity of the second earphone 312.

The portable telephone set body 302 is connected at an antenna input terminal 321 thereof to an antenna 322. The antenna input terminal 321 is connected to a radio telephone section 324 for telephone conversation. The portable telephone set body 302 includes a sound data processing section 325 for principally playing back music and a sound inputting-outputting processing section 326 connected to the radio telephone section 324 and the sound data processing section 325.

The radio telephone section 324 includes a power supply circuit 332 for supplying power to the components of the radio terminal 300 through a power supply line (not shown) connected to a battery 331. The remaining amount of the battery 331 is detected by a battery remaining amount detection section 334 in a radio telephone controlling section 333 provided in the radio telephone section 324. The radio telephone controlling section 333 includes, in addition to the battery remaining amount detection section 334, a termination detection section 335 for detecting termination of a telephone call, and a talk end detection section 336 for detecting an end of telephone conversation. The termination detection section 335 and the talk end detection section 336 detect termination of a telephone call and an end of telephone conversation from a signal obtained from a modem section 337. The modem section 337 is connected to the antenna input terminal 321 through a radio section 338 for transmitting and receiving a radio wave. A signal demodulated by the modem section 337 is inputted to and decoded by a decoder 339. A signal outputted from the decoder 339 is inputted to a signal processing section 341 in the sound inputting/outputting processing section 326. A signal of voice uttered by a user and converted by the microphone 313 of the stereo headphone microphone unit 301 is amplified by an amplifier 343 in the radio telephone section 324 through the stereo headphone microphone jack 303 and is converted from an analog signal into a digital signal by an A/D converter 344. The voice signal obtained by the conversion is encoded for transmission by an encoder 345, and is inputted to and modulated by the modem section 337 and then signaled from the antenna 322.

Figure 8:
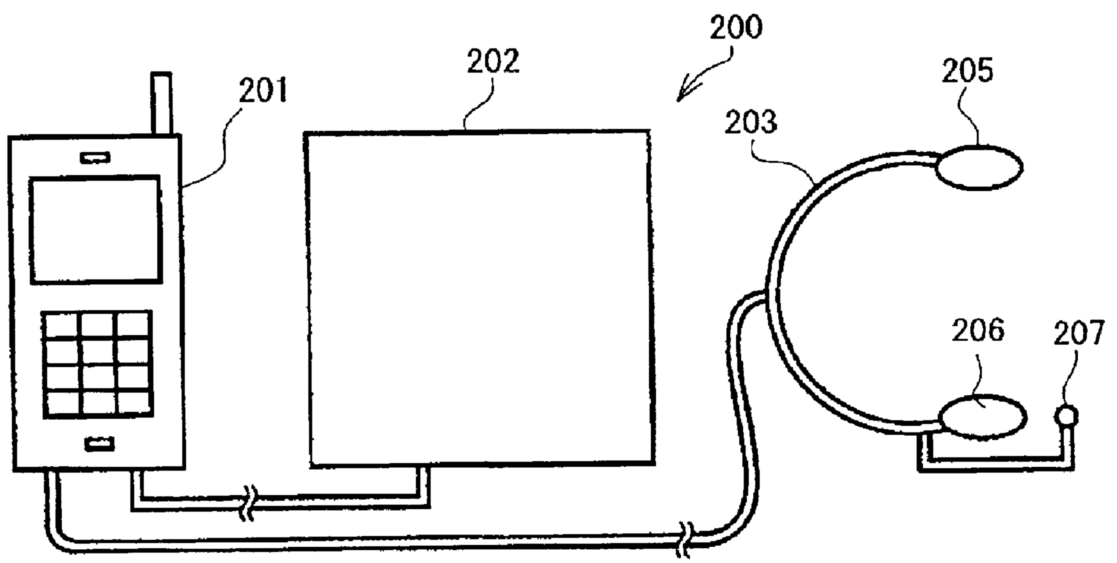
FIG. 8 is schematic view showing a general configuration of a conventional radio terminal which includes a stereo headphone microphone unit.

The sound data processing section 325 includes a music playback section 351 which stores digital sound data of music compressed by a compression method represented by the MP3 (Moving Picture Experts Group 1 Audio Layer-3) and plays back the sound data. Although such sound data can be inputted from a playback apparatus not shown for a MD (Mini Disc) or the like as described hereinabove with reference to FIG. 8, otherwise they can be acquired from a music distributing site on the Internet not shown through the radio section 338. In the embodiment, for the simplified description, the music playback section 351 is represented as a circuit which plays back digital music data. However, the music playback section 351 may otherwise play back any other digital sound data such as cold reading or recitation of a poem.

The sound data processing section 325 includes a music detection section 352, a playback state storage section 353 for storing a playback state, and a music playback controlling section 354 for controlling playback of music. The music detection section 352 is connected to the termination detection section 335. If termination of a telephone call is detected by the termination detection section 335, then the music detection section 352 detects whether or not the music playback section 351 is playing back music, and keeps the playback information until the telephone conversation comes to an end. The playback information includes information of whether the music playback section 351 is playing back upon termination of a telephone call and information indicative of, if the music playback section 351 is playing back, the volume of the music played back upon the termination and the playback position of the music. The playback position is address information of the music data (sound data) of the MP3 or the like.

A result of the detection the music detection section 352 upon the termination is transmitted also to the music playback controlling section 354. The music playback controlling section 354 is connected to the music playback section 351, music detection section 352, playback state storage section 353, talk end detection section 336, and battery remaining amount detection section 334. Playback information from the music detection section 352 and the playback state storage section 353, a talk end signal representative of an end of the telephone conversation from the talk end detection section 336, and a battery remaining amount warning signal which indicates that the remaining amount of the battery 331 from the battery remaining amount detection section 334 is poor are inputted to the music playback controlling section 354. Thus, the music playback controlling section 354 sends a control signal for playing back music or stopping playback of music to the music playback section 351. In the present embodiment, a battery remaining amount warning signal is transmitted to the music playback controlling section 354 when the remaining amount of the battery 331 become smaller than a predetermined value regarded as the lowest value sufficient for several telephone calls of a common user of the radio terminal 300.

The sound inputting/outputting processing section 326 includes a signal processing section 341 connected to the music playback section 351, a first low-pass filter 361 which receives and filters a signal outputted from the signal processing section 341 to the first earphone 311, a first amplifier 362 positioned on the output side of the first low-pass filter 361 for amplifying the output of the first low-pass filter to an arbitrary sound volume, a first D/A converter 353 positioned on the output side of the first amplifier 362, a second low-pass filter 364 which receives and filters a signal outputted from the signal processing section 341 to the second earphone 312, a second amplifier 365 positioned on the output side of the second low-pass filter 364 for amplifying the output of the second low-pass filter 364 to an arbitrary sound volume, and a second D/A converter 366 positioned on the output side of the second amplifier 365. The sound inputting/outputting processing section 326 further includes a first controlling section 367 for controlling the first amplifier 362 and the first D/A converter 363, and a second controlling section 368 for controlling the second low-pass filter 364 provided for the second earphone 312, the second amplifier 365 and the second D/A converter 366.

A sound signal of an analog level adjusted to an arbitrary sound volume through the first D/A converter 363 is inputted to the first earphone 311 through the stereo headphone microphone jack 303. Another sound signal of an analog level adjusted to an arbitrary volume through the second D/A converter 366 is inputted to the second earphone 312 through the stereo headphone microphone jack 303 similarly. Consequently, in a mode wherein music is played back, it can be played back stereophonically. The first controlling section 367 and the second controlling section 368 are both connected to the termination detection section 335 for detecting termination of a telephone call and the talk end detection section 336 for detecting an end of telephone conversation. If a telephone call terminates, then the music playback section 351 stops playback of music and the first earphone 311 enters and keeps a state wherein the user hears a ringing tone first and then hears voice of the object part of telephone conversation until the conversation comes to an end. Therefore, in order to achieve such control as just described, the first controlling section 367 controls adjustment of the filter characteristic and the sound volume and variation of the operation frequency of the first D/A converter 363. The second earphone 312 is set to a state wherein it does not output sound during telephone conversation in order to eliminate the problem that voice is caught by the microphone 313 and transmitted as an echo to the object part of telephone conversation. To this end, control of the second controlling section 368 for the second amplifier 365 is performed. It is to be noted that the first and second low-pass filters 361 and 364 are adjusted to a frequency characteristic corresponding to a sampling frequency of a sound signal outputted from the music playback section 351 during playback of music.

Figure 2:
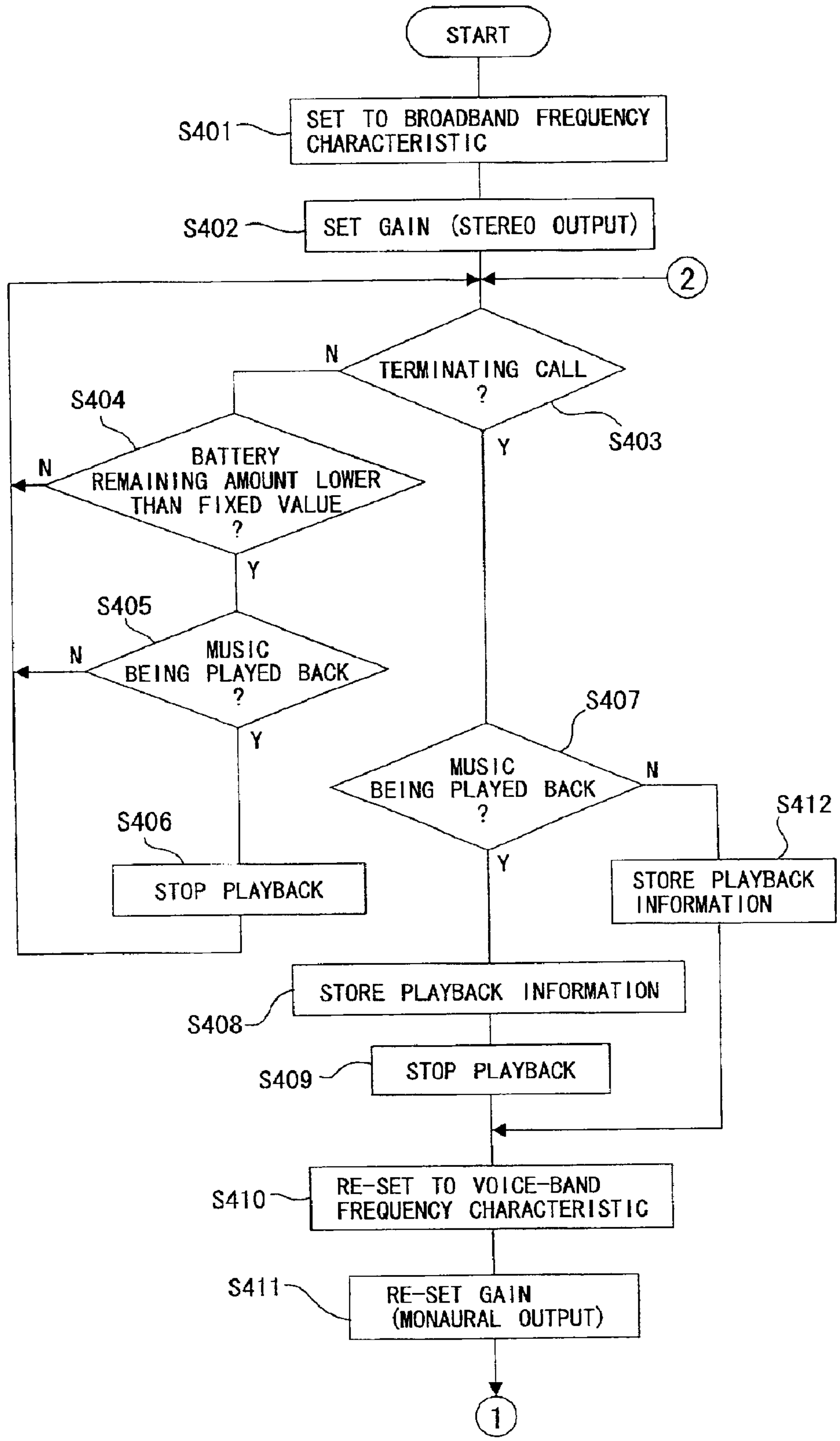
FIGS. 2 and 3 are flow charts illustrating a flow of operation of the radio terminal of FIG. 1.
Figure 3:
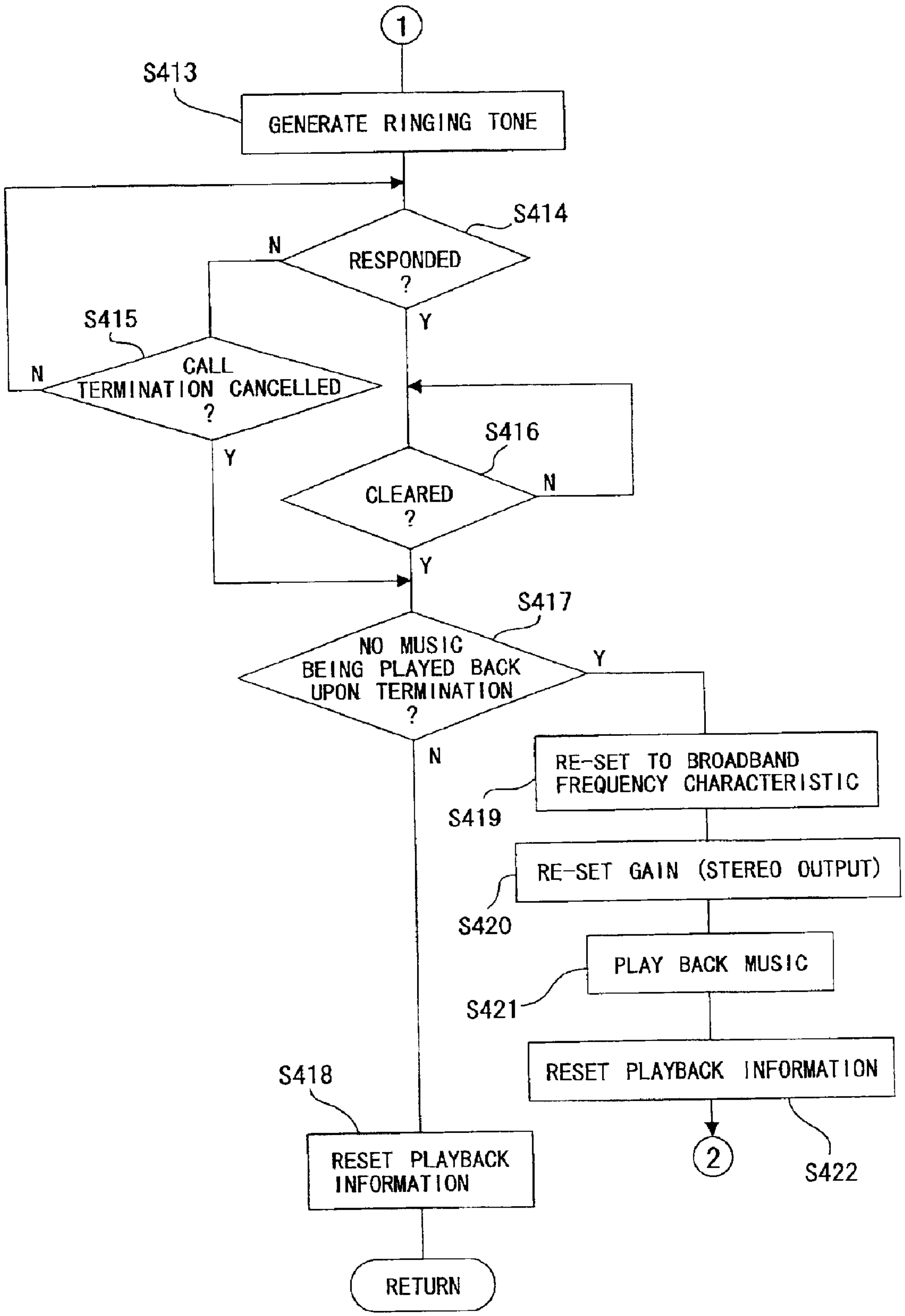

FIGS. 2 and 3 illustrate a general flow of operation of the radio terminal having the configuration described above. Control of the radio terminal 100 after power supply is connected to the radio terminal 300 is described with reference to FIGS. 2 and 3 together with FIG. 1. It is to be noted that the music playback controlling section 354, first controlling section 367, second controlling section 368 and other circuit apparatus having various functions relating to control, all of which are included in the radio terminal 300 shown in FIG. 1, are embodied by a CPU (central processing unit) not shown which executes a controlling program stored in a ROM (read only memory) not shown.

If power supply to the radio terminal 300 is connected, then the first controlling section 367 and the second controlling section 368 perform initialization so as to be suited for playback of music under the control of the CPU. In particular, the first low-pass filter 361 and the second low-pass filter 364 are set to a broad-band frequency characteristic (step S401), and the first amplifier 362 and the second amplifier 365 are set to a value which the user has set last as a value suited for playback of stereo music (step S402). In this state, it is checked whether or not the termination detection section 335 detects termination of a telephone call (step S403). The termination detection section 335 always supervises based on a signal obtained from the modem section 337 whether or not there is a terminating call, and thus checks the output result of the modem section 337. If it is discriminated that no telephone call terminates (N (No) in step S403), a detection result of the battery remaining amount detection section 334 is checked to discriminate whether or not the remaining amount of the battery 331 is lower than a fixed value (step S404). If the remaining amount of the battery 331 is lower than the fixed value (Y(Yes) in step S404), then if music is being played back (Y in step S405),then the playback of music is stopped (step S406). Then, the processing returns to the supervision control for a terminating call in step S403. If music is not being played back (N in step S405), then the processing returns directly step S403. If the remaining amount of the battery 331 is not lower than the fixed value is step S404, namely, when the remaining amount of the battery 331 is sufficient (N in step S404), the processing returns to S403.

In this manner, after the radio terminal 300 is initialized for playing back of music in steps S401 and S402, the radio terminal 300 waits for a terminating call. The user can start playback of music at any time by depressing a button not shown during the waiting of the radio terminal 300. In this instance, since the radio terminal 300 is set for playing back of music, the user can utilize the first earphone 311 and the second earphone 312 of the stereo headphone microphone unit 301 to enjoy stereophonic playback of music. However, if the remaining amount of the battery 331 becomes lower than the fixed value, then the playback of the music is stopped at a point of time when the playback of the music comes to an end (step S406). This is because, since the power consumed in playback of music data for ordinary one tune is little, it is practically beneficial to stop playback after the tune is played back entirely if no telephone call terminates.

On the other hand, if termination of a telephone call is detected in step S403 (Y), then the CPU discriminates whether or not the music playback section 351 is playing back music (step S407). If the music playback section 351 is playing back music (Y), then the playback information described hereinabove is stored into the playback state storage section 353 (step S408) and the playback of music is stopped (step S409). Then, in order to allow processing of the terminating telephone call, the CPU changes the filter characteristic to that suitable for a sampling frequency for a received voice signal so that the filter characteristic may be suitable for the voice-band frequency characteristic (step S410). Then, the CPU changes the gain of the first amplifier 362 to that suitable for an output level of a ringing tone and an output level of voice upon telephone conversation (step S411). At this time, the second controlling section 368 controls the output of the second amplifier 365 to a mute state (a state wherein the amplification factor is zero). This is intended to minimize such a situation that, upon telephone conversation, sound outputted from the second earphone 312 is inputted to the microphone 313. If it is discriminated in step S407 that music is not being played back, then the CPU stores the current playback state as playback information (step S412). Thereafter, the processing advances to step S410, in which the CPU changes the filter characteristic to that suitable for the voice-band frequency characteristic.

After setting of the voice-band for telephone conversation and adjustment of the amplification factor are performed in this manner, where the stereo headphone microphone unit 301 is connected to the stereo headphone microphone jack 303, a ringing tone is outputted using the first earphone 311 (step S413). However, where the stereo headphone microphone unit 301 is not connected to the stereo headphone microphone jack 303, a ringing tone is outputted from the speaker not shown instead. Since such switching control of sound is usually performed by other conventional apparatus using the structure of the stereo headphone microphone jack 303, a circuit for such switching control is not shown in the drawings and description of it is omitted herein.

While the ringing tone is outputted, the CPU supervises that the user responds to the terminating telephone call (steps S414 and S415). If the user responds to the terminating call (Y in step S414), then telephone conversation is started. Since the sound control for a talking mode has been performed already, no special control therefor is performed any more, and the CPU supervises the timing at which the telephone conversation comes to an end (step S416). A transmission voice signal outputted from the microphone 313 in the talking mode is inputted to the amplifier 343 of the radio telephone section 324 through the stereo headphone microphone jack 303. Then, the transmission voice signal is processed by the modem section 337 and the radio section 338 and then signaled to the other party from the antenna 322.

When the telephone conversation comes to an end in step S416 (Y), the CPU discriminates whether or not music was being played back upon the termination of the telephone call (step S417). If playback of music was not being performed (N), then the CPU resets the playback information stored in the playback state storage section 353 (step S418). Thereafter, the processing returns to step S401, and setting for music playback is performed so that playback of music may be performed at any time (steps S401 and S402). Thereafter, processing similar to that described above is performed.

If, although a ringing tone is outputted in step S413, the telephone call termination is cancelled before the user responds to the terminating telephone call (step S415: Y), then the processing advances to step S417, in which the CPU checks whether or not playback of music was being performed upon the telephone call termination. If playback of music was not being performed (N), then the playback information is reset similarly as described above (step S418).

On the contrary, if playback of music was being performed upon the telephone call termination in step S417 (Y), then the playback of the music is continued after the telephone conversation comes to an end. To this end, the first controlling section 367 and the second controlling section 368 set the first low-pass filter 361 to the broad-band frequency characteristic (step S419) and the first amplifier 362 and the second amplifier 365 are set to a value equal to that set last by the user as a value suited for playback of stereo music (step S420). Then, based on the information representative of the playback position of the music, the music is played back from the position (step S421). Such playback of music may be performed otherwise from a timing prior by several seconds in time to the position. Consequently, the stored playback information becomes unnecessary any more, and therefore, the playback information is reset (step S422). Thereafter, the processing advances to step S403, in which the CPU supervises termination of a telephone call.

It is to be noted that, while control of the embodiment regarding termination of a telephone call is described above, the radio terminal 300 can perform control similar to that described above also when the user originates a call using the radio terminal 300.

First Modification

Figure 4:
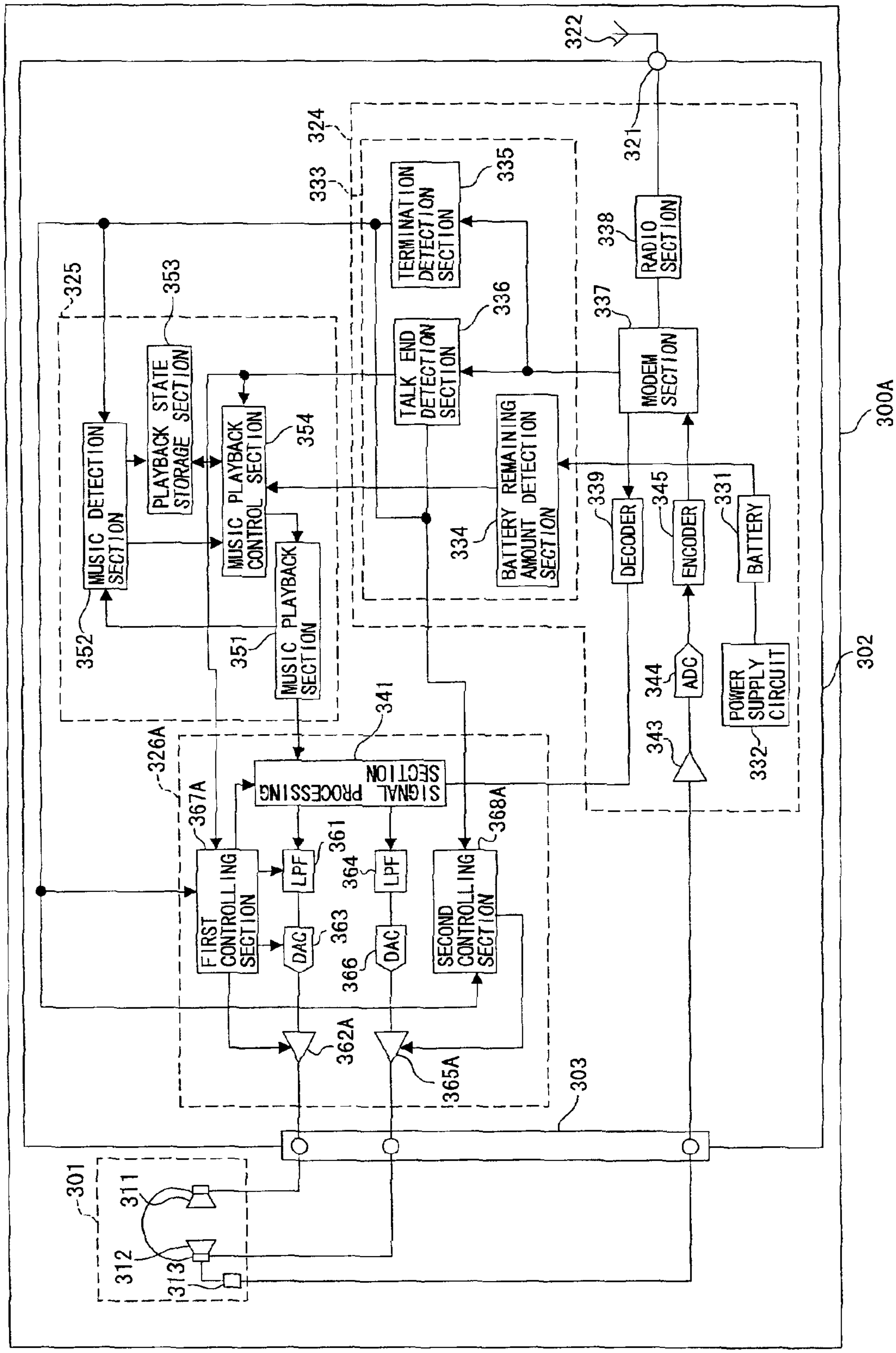
FIGS. 4 to 6 are block diagrams showing configurations of different modifications to the radio terminal of FIG. 1.

FIG. 4 shows a first modification to the embodiment described above. Referring to FIG. 4, the modified radio terminal is generally denoted at 300A and is different from the radio terminal 300 of the embodiment described above in that it includes a sound inputting/outputting processing section 326A in place of the sound inputting/outputting processing section 326 described above. The sound inputting/outputting processing section 326A is a little different in circuit configuration from the sound inputting/outputting processing section 326. In particular, in the modified radio terminal 300A, the first D/A converter 363 is connected to the output side of the first low-pass filter 361 which receives and filters one of sound signals outputted from the signal processing section 341 which is outputted toward the first earphone 311, and a first amplifier 362A for amplifying a signal of an analog level is disposed next to the first D/A converter 363. Consequently, a sound signal amplified by the first amplifier 362A is inputted to the first earphone 311 through the stereo headphone microphone jack 303. Similarly, the second D/A converter 366 is connected to the output side of the second low-pass filter 364 which receives and filters the other one of the sound signals outputted from the signal processing section 341 which is outputted toward the second earphone 312, and a second amplifier 365A for amplifying a signal of an analog level is disposed next to the second D/A converter 366. Consequently, a sound signal amplified by the second amplifier 365A is inputted to the second earphone 312 through the stereo headphone microphone jack 303.

Thus, in the modified radio terminal 300A, the positions of the amplifiers and the D/A converters are reversed when compared with those of the radio terminal 300 described above with reference to FIG. 1. Accordingly, the first controlling section 367A and the first D/A converter 363 or the second controlling section 368A and the second D/A converter 366 control the first amplifier 362A or the second amplifier 365A in an analog fashion.

Second Modification

Figure 5:
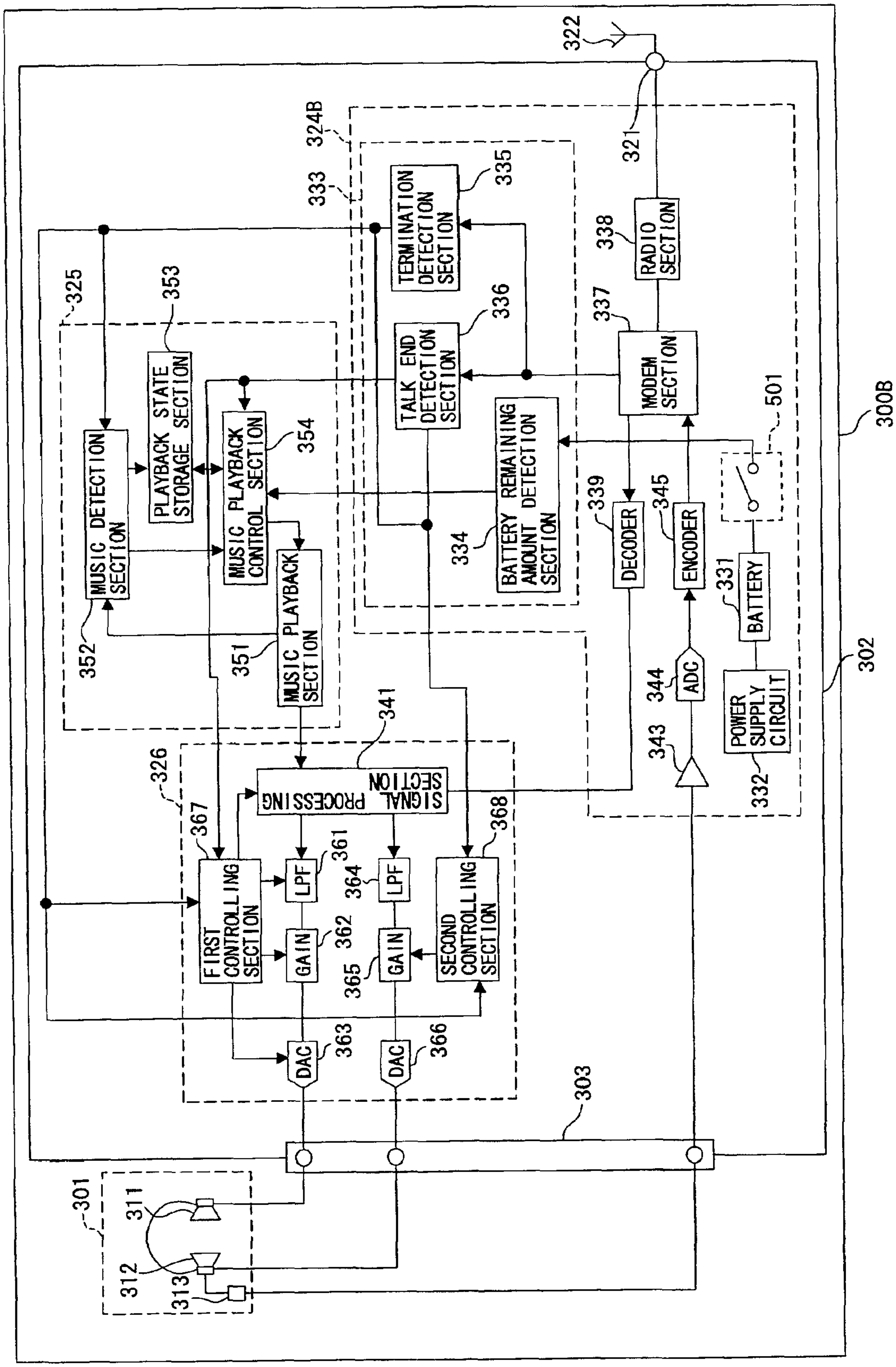

FIG. 5 shows a second modification to the embodiment described above. Referring to FIG. 5, the modified radio terminal is generally denoted at 300B and is different from the radio terminal 300 of the embodiment described above in that it additionally includes a radio telephone section 324B in place of the radio telephone section 324. The radio telephone section 324B is different from the radio telephone section 324 in that it additionally includes a changeover switch 501 interposed between the battery 331 and the battery remaining amount detection section 334. The changeover switch 501 is switched, for example, in response to an insertion terminal (not shown) of a spare battery pack (not shown) for the radio terminal 300B. The spare battery pack is a spare power supply for supplying power to the components of the radio terminal 300B when the battery 331 accommodated in the radio terminal 300B is consumed. Where the radio terminal 300B includes such a spare battery pack as just described, even if the power supply of the battery 331 accommodated in the radio terminal 300B becomes lower than a fixed value, the radio terminal 300B can receive a terminating telephone call and need not stop its playback of music. Therefore, in the modified radio terminal 300B, where a power supply terminal of the spare battery pack is inserted in the insertion terminal described above, the changeover switch 501 is in an off-state. In this state, the battery remaining amount detection section 334 does not detect the remaining amount of the battery 331.

Third Modification

Figure 6:
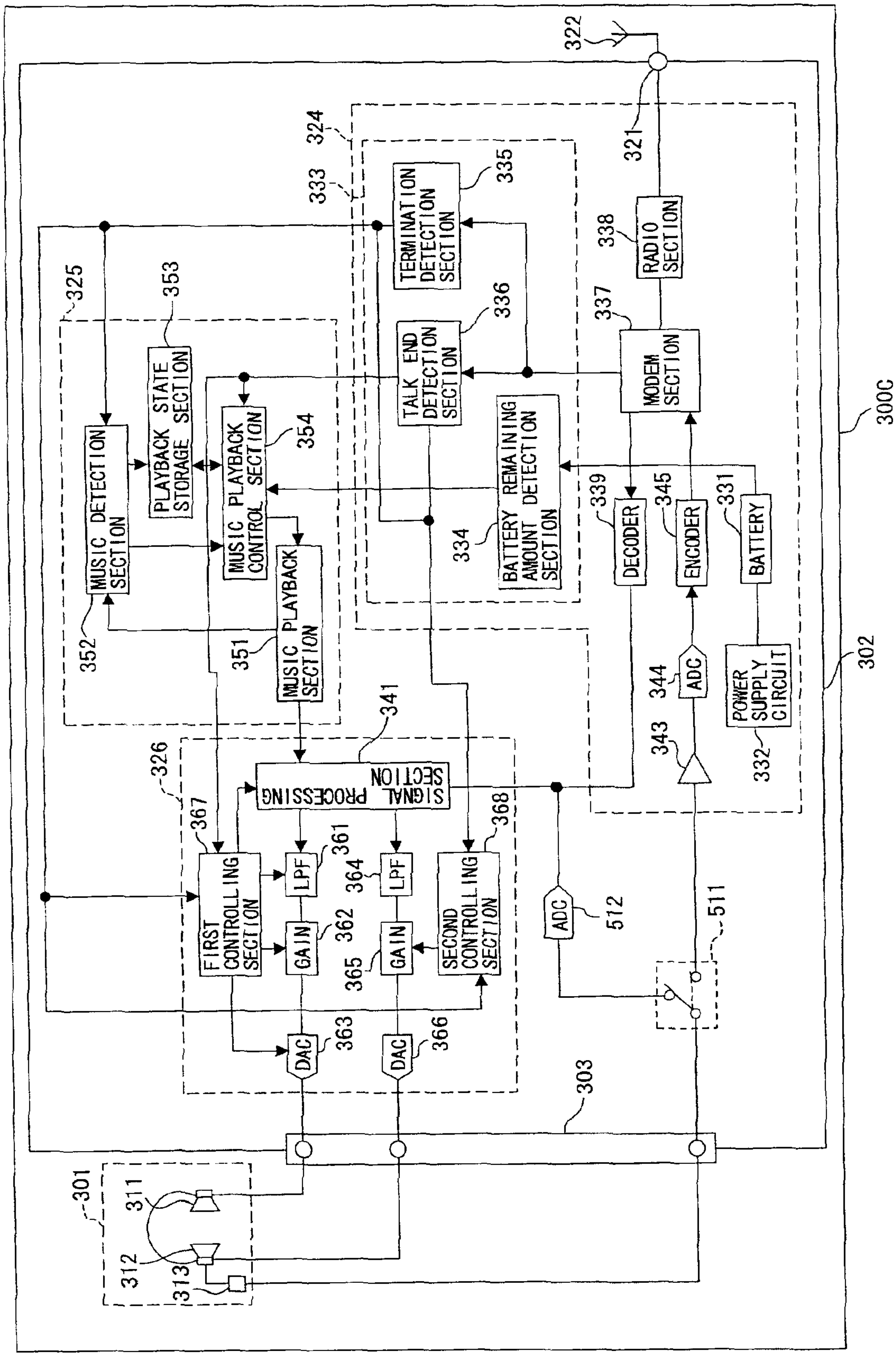
Figure 7:
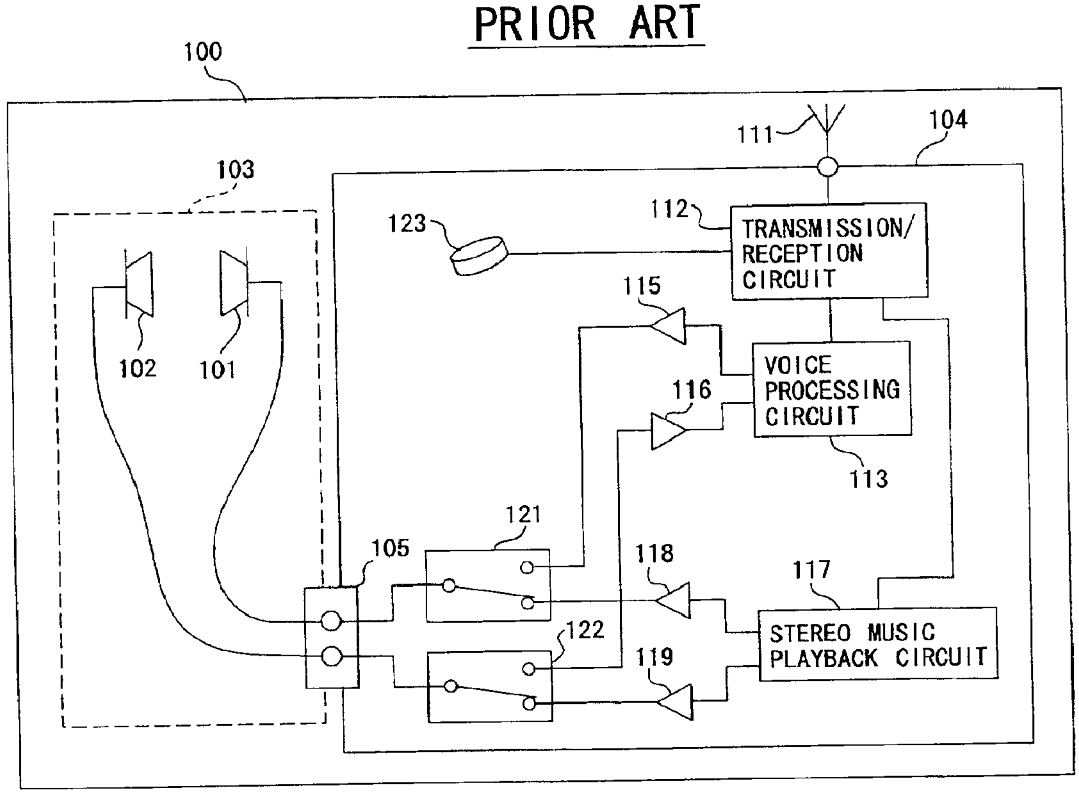
FIG. 7 is a block diagram showing part of a circuit of a conventional radio terminal.

FIG. 6 shows a third modification to the embodiment described above. Referring to FIG. 6, the modified radio terminal is generally denoted at 300C and is different from the radio terminal 300 of the embodiment described above in that it additionally includes a changeover switch 511 and an A/D converter 512. The changeover switch 511 has a common contact and first and second switching contacts and is interposed in a path from the stereo headphone microphone jack 303 to the amplifier 343 such that sound from the microphone 313 may be inputted to the amplifier 343 of the radio telephone section 324 through the changeover switch 511. The common contact of the changeover switch 511 is connected to the stereo headphone microphone jack 303 side, and the first switching contact of the changeover switch 511 is connected to the amplifier 343. The second switching contact of the changeover switch 511 is connected to the input side of the A/D converter 512, whose output side is connected to the signal processing section 341 in the sound inputting/outputting processing section 326. The changeover switch 511 may be disposed at a location of a body of the radio terminal 300C at which the user can operate it readily or may alternatively be interposed in a cable from the stereo headphone microphone unit 301 to the stereo headphone microphone jack 303.

If the user of the radio terminal 300C having the configuration described above tries to listen to an external announcement or to talk with another person during playback of music by means of the music playback section 351, then the user will switch the changeover switch 511 from the first switching contact side indicated by a solid line in FIG. 6 to the second switching contact side, that is, to the input side of the A/D converter 512, indicated by a broken line. Consequently, a sound signal outputted from the microphone 313 is inputted to the A/D converter 512, by which it is converted into a digital signal. The digital sound signal from the A/D converter 512 is inputted to the signal processing section 341. Consequently, the signal processing section 341 performs a controlling operation similar to that when a telephone call terminates at the radio terminal 300C.

In particular, the signal processing section 341 either interrupts a signal for playback sound of music to be sent from the music playback section 351 to the first earphone 311 or suppresses the output level of the signal, and signals the sound signal of the user inputted thereto through the A/D converter 512 to the first earphone 311. To this end, the frequency characteristic of the first low-pass filter 361, the amplification level of the first amplifier 362 and the setting contents of the first D/A converter 363 are suitably changed for voice processing. Further, the signal processing section 341 performs the processing described above for muting a signal for the playback sound of music to be sent from the music playback section 351 to the second earphone 312 to prevent an echo from being transmitted to the other party of telephone conversation. Consequently, the user can listen to external sound or talk with another person while the user wears the stereo headphone microphone unit 301 thereon. If a telephone call terminates while the radio terminal 300C is used in this state, then the user will restore the original condition of the changeover switch 511 manually or automatically and start telephone conversation with the other party as described hereinabove.

It is to be noted that, while the radio terminal 300 of the embodiment described above employs the stereo headphone microphone jack 303 which includes the first earphone 311, the second earphone 312 and the microphone 313 disposed in the proximity of the second earphone 312, naturally it is possible to use a first speaker in place of the first earphone 311 and use a second speaker in place of the second earphone 312.

Further, while the first to third modified radio terminals described above are modified at different portions from one another, when it is tried to produce a radio terminal, the techniques described above in connection with the embodiment of the present invention and the modifications to the embodiment may be combined suitably to produce a radio terminal which is different from the embodiment and the modifications. Also the radio terminal in this instance naturally falls within the scope of the present invention.

Further, while the foregoing description relates to portable terminals which use a radio technique, the present invention can naturally be applied also to portable terminals which does not use a radio technique.

While a preferred embodiment of the present invention has been described using specific terms, such description is for illustrative purposes only, and it is to be understood that changes and variations may be made without departing from the spirit or scope of the following claims.

What is claimed is:

1. A portable terminal, comprising:

a stereo headphone microphone unit including first and second electroacoustic conversion means for converting an electric signal into sound and a microphone disposed in the proximity of said second electroacoustic conversion means;

sound data storage means for storing at least part of sound data of music or the like;

sound data playback means for reading out the sound data from said sound data storage means and outputting the sound data;

stereo amplification means for amplifying the sound data outputted from said sound data playback means and supplying the amplified sound data to said first and second electroacoustic conversion means of said stereo headphone microphone unit so that sound may be outputted in stereo from said first and second electroacoustic conversion means;

call termination detection means for detecting termination of a call;

playback temporary stopping means for temporarily stopping, if the sound data is being played back by said sound data playback means at a point of time when said call termination detection means detects termination of a call, the playback of the sound data; and control means for disabling an output of said stereo amplification means which corresponds to said second electroacoustic conversion means of said stereo headphone microphone unit but enabling telephone conversation by means of said first electroacoustic conversion means and said microphone at a point of time when said call termination detection means detects termination of a call.

2. The portable terminal of claim 1, wherein, upon playback of the sound data by said sound data playback means, said control means controls said stereo amplification means to an on-state in order to allow the sound data read out from said sound data storage means to be amplified and outputted to said first and second electroacoustic conversion means; and when said call termination detection means detects termination of a call, said control means controls a second one of said stereo amplification means, corresponding to said second electrostatic conversion means, to an off-state and controls a first one of said stereo amplification means, corresponding to said first electroacoustic conversion means, to a state for telephone conversation so that telephone conversation by means of said first electroacoustic conversion means and said microphone is enabled.

3. A portable terminal, comprising:

a stereo headphone microphone unit including first and second electroacoustic conversion means for converting an electric signal into sound and a microphone disposed in the proximity of said second electroacoustic conversion means;

sound data storage means for storing at least part of sound data of music or the like;

sound data playback means for reading out the sound data from said sound data storage means and outputting the sound data;

stereo amplification means for amplifying the sound data outputted from said sound data playback means and supplying the amplified sound data to said first and second electroacoustic conversion means of said stereo headphone microphone unit so that sound may be outputted in stereo from said first and second electroacoustic conversion means;

call termination detection means for detecting termination of a call;

playback temporary stopping means for temporarily stopping, if the sound data is being played back by said sound data playback means at a point of time when said call termination detection means detects termination of a call, the playback of the sound data;

control means for disabling an output of said stereo amplification means which corresponds to said second electroacoustic conversion means of said stereo headphone microphone unit but enabling telephone conversation by means of said first electroacoustic conversion means and said microphone at a point of time when said call termination detection means detects termination of a call; and sound playback re-starting means for re-starting, if the playback of the sound data is proceeding when the call terminates, the playback of the sound data at a point of time at which the telephone conversation comes to an end in a condition wherein the outputs of said stereo amplification means to said first and second electroacoustic conversion means are enabled from the point of the sound data at which the playback is stopped by said playback temporary stopping means.

4. A portable terminal, comprising:

a stereo headphone microphone unit including first and second electroacoustic conversion means for converting an electric signal into sound and a microphone disposed in the proximity of said second electroacoustic conversion means;

sound data storage means for storing at least part of sound data of music or the like;

battery remaining amount detection means for detecting a remaining amount of a battery for supplying power to the entire portable terminal;

sound data playback means for reading out the sound data from said sound data storage means and outputting the sound data;

stereo amplification means for amplifying the sound data outputted from said sound data playback means and supplying the amplified sound data to said first and second electroacoustic conversion means of said stereo headphone microphone unit so that sound may be outputted in stereo from said first and second electroacoustic conversion means;

control means for enabling telephone conversation by means of said first electroacoustic conversion means and said microphone in a condition wherein an output of said stereo amplification means which corresponds to said second electroacoustic conversion means of said stereo headphone microphone unit is disabled; and sound data playback limitation means for limiting playback of sound by said sound data playback means when the remaining amount of the battery detected by said battery remaining amount detection means is smaller than a lowest limit amount with which a predetermined talking amount is assured.

5. A portable terminal as claimed in claim 4, further comprising a switch for invalidating the detection of said battery amount detection means.

6. A portable terminal, comprising:

a stereo headphone microphone unit including first and second electroacoustic conversion means for converting an electric signal into sound and a microphone disposed in the proximity of said second electroacoustic conversion means;

sound data storage means for storing at least part of sound data of music or the like;

sound data playback means for reading out the sound data from said sound data storage means and outputting the sound data;

stereo amplification means for amplifying the sound data outputted from said sound data playback means and supplying the amplified sound data to said first and second electroacoustic conversion means of said stereo headphone microphone unit so that sound may be outputted in stereo from said first and second electroacoustic conversion means;

a changeover switch disposed at a position of said potable terminal at which said changeover switch can be operated by a user while the user wears said stereo headphone microphone thereon; and control means for transmitting an output of said microphone to said first electroacoustic conversion means when said changeover switch is on and for stopping an output of said second electroacoustic conversion means and suppressing or stopping an output of said sound data playback means while the on-state of said changeover switch continues, further comprising:

playback temporary stopping means for temporarily stopping, if the sound data is being played back by said sound data playback means at a point of time when said call termination detection means detects termination of a call, the playback of the sound data; and control means for disabling an output of said stereo amplification means which corresponds to said second electroacoustic conversion means of said stereo headphone microphone unit but enabling telephone conversation by means of said first electroacoustic conversion means and said microphone at a point of time when said call termination detection means detects termination of a call.

* * * * *